Jan. 8, 1924.  
W. H. KOPITKE  
1,480,270  
BEET HARVESTING MACHINE  
Filed Nov. 20, 1920  
7 Sheets-Sheet 1

INVENTOR  
William H Kopitke,  
By Owen Owen T Crampton  
His attys.

Jan. 8, 1924.

W. H. KOPITKE

BEET HARVESTING MACHINE

Filed Nov. 20, 1920

INVENTOR
William H. Kopitke,
By Owen Owen & Crampton.
His attys.

Patented Jan. 8, 1924.

1,480,270

UNITED STATES PATENT OFFICE.

WILLIAM H. KOPITKE, OF TOLEDO, OHIO, ASSIGNOR TO AMERICAN BEET HARVESTER COMPANY, OF TOLEDO, OHIO, A CORPORATION OF DELAWARE.

BEET-HARVESTING MACHINE.

Application filed November 20, 1920. Serial No. 425,321.

*To all whom it may concern:*

Be it known that I, WILLIAM H. KOPITKE, a citizen of the United States, and a resident of Toledo, in the county of Lucas and State of Ohio, have made an invention appertaining to Beet-Harvesting Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to beet harvesting machines, and particularly to the beet topping mechanisms thereof.

In the topping of beets the depth of the top portion or crown to be removed with the foliage is determined largely by the extent of projection of a beet above the ground, but is not coextensive with such projection. In other words, it is not necessary to remove the entire portion of a beet projecting above the ground, but the portion removed, for perfect topping, invariably increases in depth proportionally with the depth of exposure of the beet top. In topping by hand an expert topper knows the depth of cut that should be taken on each beet and gauges his cut accordingly, and this is one of the important features of beet topping which it is desirable to perform automatically by mechanical means.

One of the primary objects of this invention is the provision of a topping mechanism which, as it rides over successive beet tops in a row, is vertically moved thereby to accommodate itself to the heights of the succeeding beets and will have its top cutting means automatically adjusted to take a depth of cut of each beet which is suitable or proper for the extent of projection of the beet above the ground, so that each beet may have the required amount of top removed therefrom. Further objects and advantages of the invention will be apparent from the following detailed description.

While the invention, in its broader aspect, is capable of embodiment in numerous forms, a preferred embodiment thereof is illustrated in the accompanying drawings, in which,—

Figure 1:
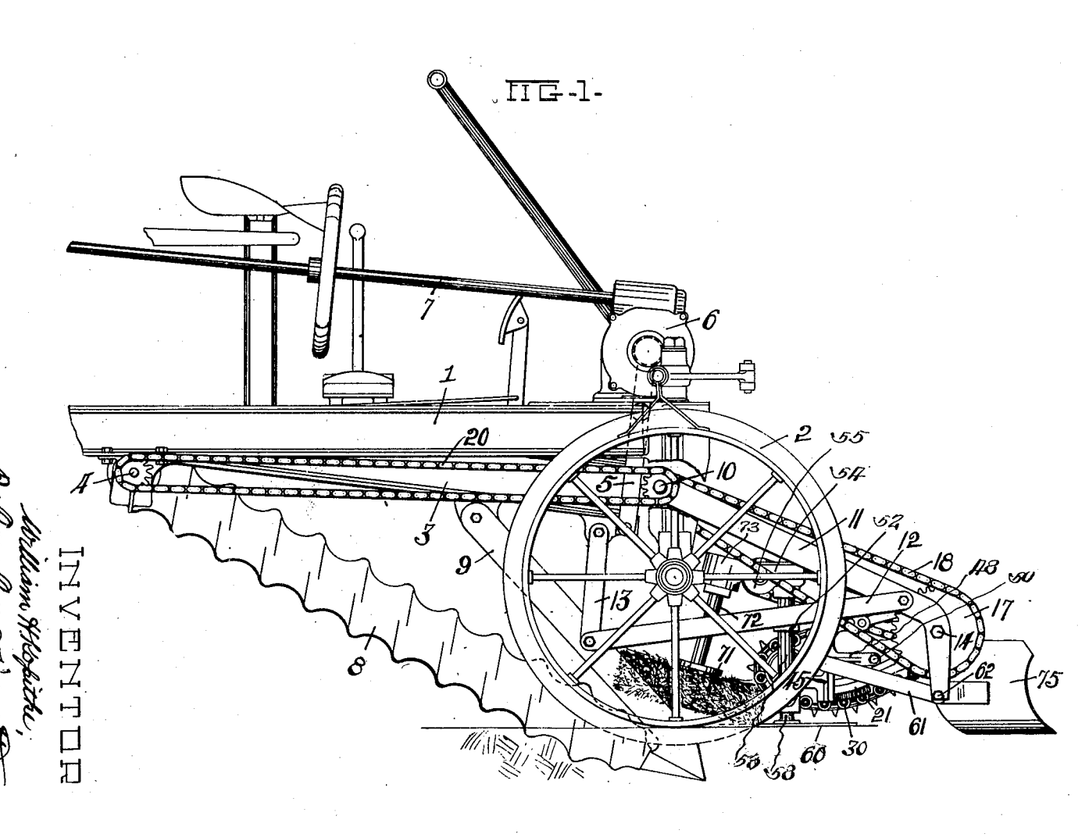
Figure 1 is a side elevation of the front portion of a beet harvesting machine embodying the invention, with parts removed.

Referring to the drawings (Fig. 1), 1 designates the main frame of a machine embodying the invention, which frame is supported at its forward end by wheels 2, mounted for horizontal turning movements to facilitate a steering of the machine, and is supported at its rear end by wheels not shown, as is customary in machines of this type. An adjustable frame 3 is mounted, in the present instance, in the frame 1, for vertical tilting adjustment, and for such purpose has its rear end pivotally supported on a shaft 4 carried by the frame 1 and its forward end suspended by links 5 from any suitable raising and lowering mechanism, which, in the present instance, is designated 6 and controlled by a turning of the shaft 7. A pair of longitudinally extending augers 8 project downward and forward from the shaft 4 and are connected at their forward ends to the frame 3 by a pair of upwardly and rearwardly extending brace arms 9, whereby the augers and adjustable frame are caused to have vertical adjusting movements together. The augers are laterally spaced in a horizontal plane and are adapted to project at their forward ends into the ground at opposite sides of a beet row to lift the beet from the ground and then to convey them upward and rearward to a desired point. The use of these augers is old in the art and nothing new is claimed therefor.

A shaft 10 is journaled transversely in the forward end of the main frame 1 and has an arm 11 projecting forward and downward therefrom at each side of the longitudinal frame center for vertically swinging movements. A brace link 12 extends rearwardly from the forward end of each arm 11 to the adjacent frame arm 9 and serves to connect the two members so that when the frame 3 and augers 8 are raised from lowered position the arms 11 are swung upward, and vice versa. The arms 9 are braced relative to the frame 3 by links 13 connecting the same, as shown.

Figure 6:
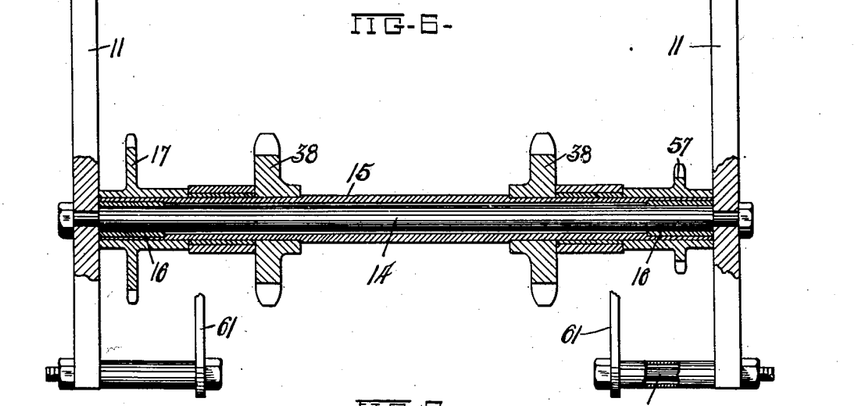
Fig. 6 is a longitudinal section through the pivotal mounting and driving means for the tread belt and frame members.
Figure 7:
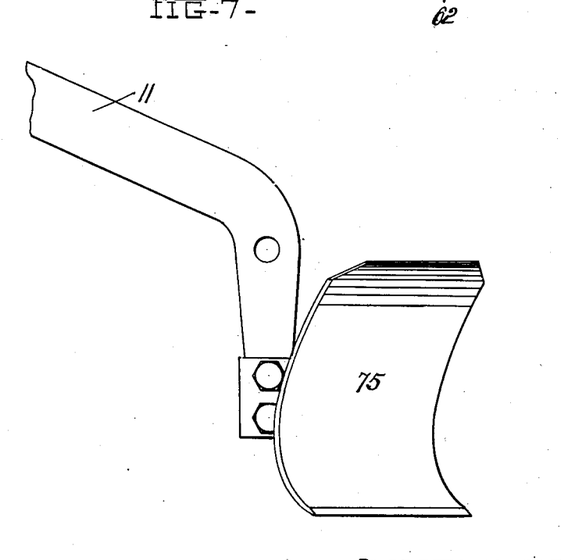
Fig. 7 is an outer side view of the free end portion of one of the topping mechanism carrying arms and an attached scraper plate.
Figure 8:
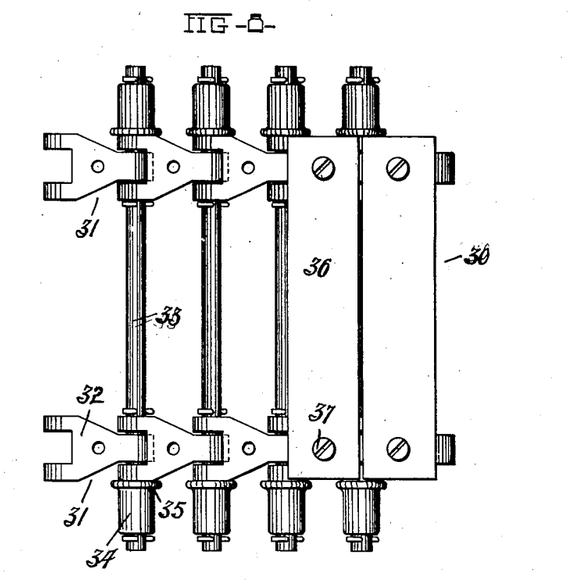
Fig. 8 is an enlarged plan detail of a portion of the tread belt with parts removed.
Figure 9:
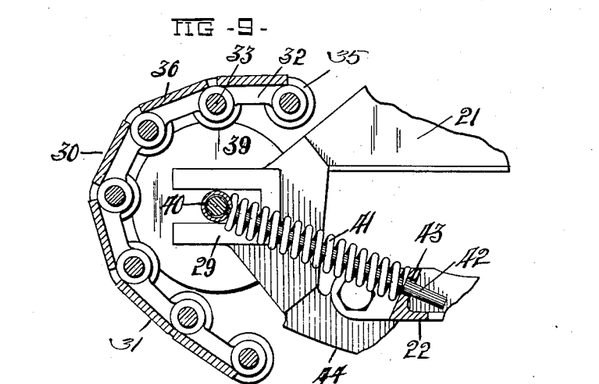
Fig. 9 is an enlarged fragmentary section of a portion of the tread belt and its carrying means taken substantially on the line 9 in Fig. 4.

The arms 11 at their forward ends are angled downwardly and, in the present instance, at substantially the angle thereof are rigidly connected by a stationary cross-shaft or binding rod 14 (Fig. 6). Rotatably mounted on the rod 14 intermediate the frame arms 11 is a hollow shaft or rotatable sleeve 15, the length of which is substantially coextensive with the space between the arms and which preferably has end bearings only on the rod 14 through intermediate bearing bushings 16. The shaft has a sprocket wheel 17 fixed to one end thereof and connected by a sprocket chain 18 to a sprocket wheel 19 on the respective end of the shaft 10 so that rotation may be imparted from one to the other of the shafts 10 and 15. The shaft 10 may be driven by any suitable means and in the present instance is shown as having chain and sprocket wheel connection 20 with the shaft 4, which in turn may be driven by any suitable mechanism not shown.

A tread belt carrying frame pivotally trails from the shaft 15 and comprises a pair of side members 21, 21, a bottom member 22, which rigidly connects the lower edge portions of the side frame members, being secured at front and rear to the respective members by bolts 23, and a top cross rod or shaft 24. Each side member 21 has a bearing 25 at its forward end for loosely receiving the shaft 15. Each side member 21 is of skeleton form to provide a large opening 26 therein and has a boss or arm 27 projecting upward from its top intermediate its ends and fixed to the cross-rod or shaft 24, which rod cooperates with the bottom member 22 to rigidly space the frame side members. The rear end of each side member 21 is provided with an inwardly offset portion 28, forming a rearwardly extending bearing fork 29.

Figure 4:
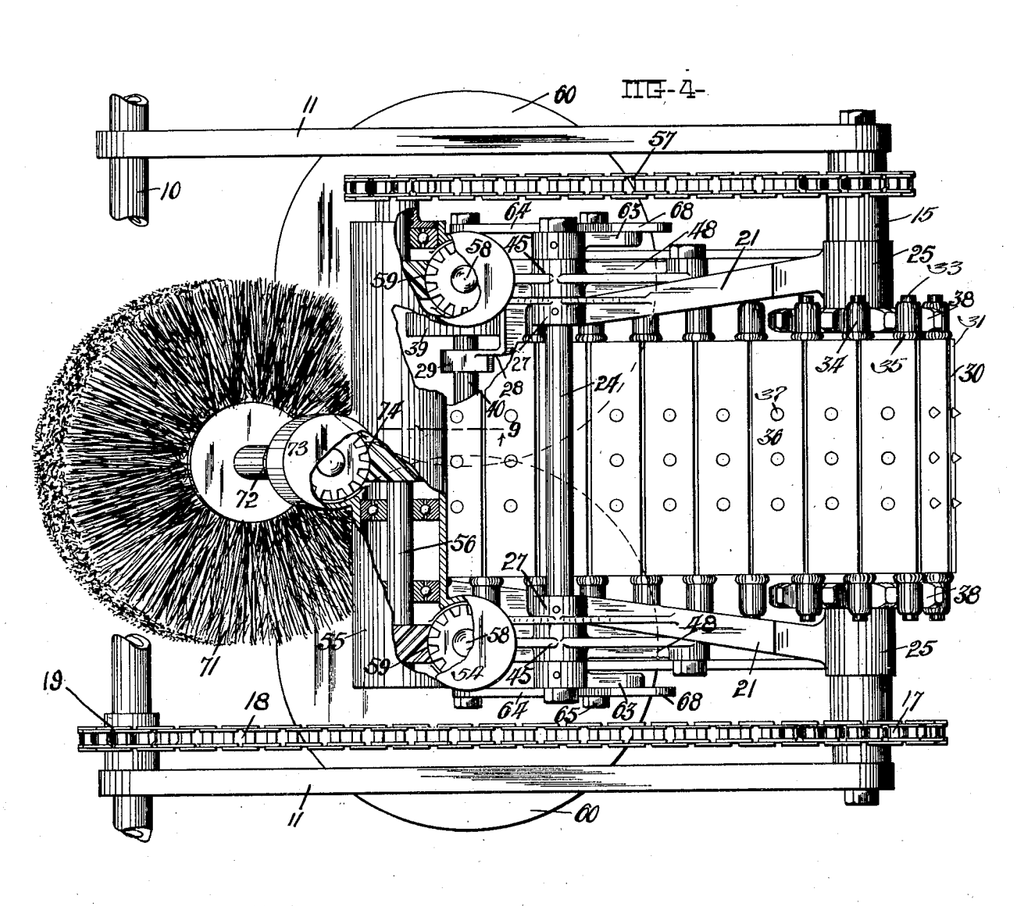
Fig. 4 is an enlarged top plan view of the topping mechanism with parts removed and parts broken away.
Figure 5:
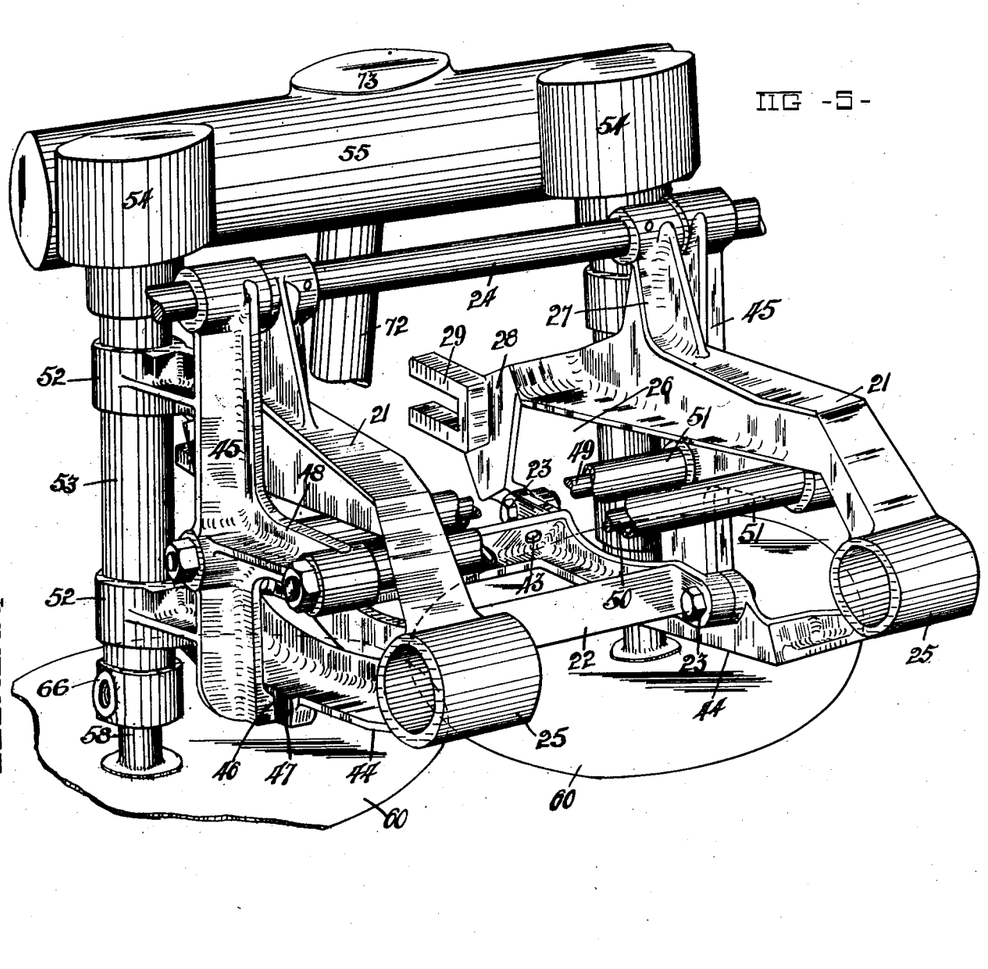
Fig. 5 is an enlarged perspective view of the frame of the topping mechanism with parts removed and with the cutters in position.

The tread belt 30 comprises two laterally spaced endless chains 31, the links 32 of which are pivotally connected together at their adjacent ends by cross-shafts 33, each carrying rollers 34 at the ends thereof without the chains, the inner ends of the rollers being preferably provided with annular flanges 35. Each pair of transversely aligned links of the two chains is connected by a pressure plate 36 secured at its ends to the respective links by screws 37, or in any other suitable manner. This tread belt at its forward end extends around a pair of drive sprocket-wheels 38 fixed in transversely spaced relation to the shaft 15 and adapted to be engaged by the respective sets of rollers 34 of the belt, as shown in Fig. 4. The lower reach of the belt extends rearwardly under the bottom member 22, and the upper reach thereof extends rearwardly between the upper portions of the frame sides 21 and connects at its rear end with the lower reach around a pair of guide wheels 39 mounted loosely at the outer sides of the respective bearing forks 29 on the ends of a shaft 40, which is mounted in the bearing fork for lateral movements therein longitudinally of the frame. A yielding belt stretching tension is exerted on the shaft 40 and wheels 39 by a pair of coiled expansion springs 41, one of which is mounted adjacent to each bearing fork 29 around a rod 42, with the front end thrust thereof against the rear edge of the bottom member 22. The rod 42 is connected at its rear end to the shaft 40 and has its forward end projecting through a guide aperture 43 in the member 22. During the lower reach of movement of the tread chain the rollers 34 at the side edges thereof travel under the bottom edges of the respective frame sides 21, which edges form guides 44 therefor and resist an upward movement of the lower reach of the belt relative to the carrying frame, thus causing the tread belt and its frame to rise and fall together as the belt passes over the tops of the beets.

The frame which carries the topping knives, and which may therefore be referred to as the topping frame, is carried by the belt carrying or tread frame for pivotal movements longitudinally thereof and vertical movements therewith. This topping frame comprises the two vertically disposed side bars 45, 45, which pivotally depend from the shaft or rod 24 at the outer sides of the respective frame sides 21 and each extends at its lower end to the lower edge of the frame side 21 and has a lateral bearing face 46 in sliding bearing contact with a bearing surface 47 on the outer lower edge of the respective frame side 21. The bearing surface 47 extends longitudinally of the frame side and describes an arc concentric to the axis of the shaft 24 so that the lower edge of the side bar 45 may remain in bearing contact therewith during the maximum swinging range of such member relative to the tread frame. Each bar 45 has an arm 48 projecting forward therefrom intermediate its ends and at the side of the opening 26 in the adjacent frame side 21. A bolt-rod 49 connects the side bars 45 at the rear ends of the arms 48 and a bolt-rod 50 connects the forward ends of said side arms, both rods extending through the openings 26 in the frame sides 21 and each being encircled by a spacing sleeve 51 intermediate the side bars.

A pair of bearing arms 52, 52 extend rearwardly from each side bar 45 in vertically spaced relation and form vertically aligned bearings through which a hollow upright 53 is mounted for vertical reciprocatory movements, one of said uprights being provided for each side bar. The uprights 53 are provided at their upper ends with hollow heads 54, which are connected by a hollow cross-housing or member 55. The housng 55 has a shaft 56 (Fig. 4) journaled therein lengthwise thereof, and one end of this shaft projects from the housing and is in chain and sprocket-wheel connection 57 with the shaft 15. A vertical shaft 58 is journaled in each upright 53 and has its upper end in driven connection with the shaft 56 through a set of spiral gears 59. The lower end of each shaft 58 carries one of a pair of coacting topping disks 60, which have their coacting edges disposed below the rear portion of the tread belt 30 in vertically spaced relation thereto.

In order that the tread frame and topping frame may have predetermined relative pivotal movements imparted thereto during vertical rocking movements of the tread frame as its belt passes over the irregular tops of a row of beets, a link 61 is disposed at each side of the topping mechanism, being pivoted at its forward end to the lower end of the respective frame bar 11, at 62, and being pivoted at its rear end to the respective outer end of the bolt rod 49. The distance from the bolt-rod 14, forming the swinging axis for the tread frame, and the bolt-rod 24, forming the swinging axis for the topping frame, is the same as the distance between the pivotal connections of the links 61, and the vertical distance from the axis of the bolt-rod 14 to the center of the pivot 62 is the same as the vertical distance between the axes of the bolt rods 24 and 49, thus forming a parallelogram which will maintain the topping frame in constant vertical position, or parallel to the vertical line of connection of the pivotal centers 14 and 62, during any extent of vertical swinging movement of the tread frame.

A downwardly and forwardly projecting arm 63 is fixed to the shaft or bolt-rod 24 at each end thereof without the respective side bar 45 so that each arm will have fixed relation to the tread frame. It is thus evident that upon a swinging of the tread-frame about its pivotal center 14 the arms 63 will have swinging movements relative to the topping-frame, as evidenced by the relative positions of the parts in Figs. 2 and 3. A link 64 extends downwardly from each arm 63, being pivotally connected thereto by a bolt 65, and is pivotally connected at its lower end to the upright 53, in the present instance, to a collar 66 thereon, which is fixed to the upright below the lower bearing 52. This collar is adapted to coact with said bearing to act as a stop to limit the relative upward movement of the upright. It is evident that when the tread-frame is raised relative to the carrying arms 11 from the normal lowered position thereof, shown in Fig. 2, to the elevated position, shown in Fig. 3, the arms 63 will be swung downward and rearward and effect a lowering of the uprights 53 and associated cutter discs 60 relative to the bottom of the tread-belt, so that the distance between the cutting discs and tread-belt is gradually widened during a raising of the tread-frame and is gradually narrowed during a lowering thereof, thereby effecting a variance in the depth of cut of a beet top depending on the extent of projection of the top above the ground. It is also evident that when the tread-frame is lowered to the maximum extent to which it may be adjusted, the stop collar 66 will coact with the adjacent bearing 52 and prevent a further lowering of the tread-frame due to the link and lever arm connection between the tread-frame shaft 24 and the topping-frame uprights 53. While the varying of the spacing between the cutter discs and tread-belt occurs during any vertical movement of the tread frame, such variance is less than the movement of the frame but proportional thereto. This is illustrated in Fig. 3 where the dotted line $a$ indicates the movement of the frame and the line $b$ the movement of the cutter disc relative to the frame. It is therefore evident that if the tread-frame be raised a distance equal to the distance $a$ (Fig. 3) by a beet over which it passes, the portion of such beet which is removed by the topping action will be the depth $b$ greater than the depth of a cut taken from a beet over which the tread-belt passes when at its lowermost point.

The connection between the topping-knives and tread-frame, may be varied to increase or diminish the extent of movement of the knives relative to the tread-belt proportionally with the raising and lowering movement by varying the point of connection of the upper ends of the link 64 with the arms 63. For this purpose each arm 63 is provided with a plurality of openings 67 spaced longitudinally of the arm with which the bolt 65 may be engaged, and the upper end of each link is also provided with a forwardly projecting arm 68 with a series of longitudinally spaced openings 69 for receiving the bolt 65. The adjustment may therefore be effected either by adjusting the space between the bolt 65 and shaft 24 or by shifting the upper angled end of the link 64 laterally with respect to the bolt, or by both means.

Figure 2:
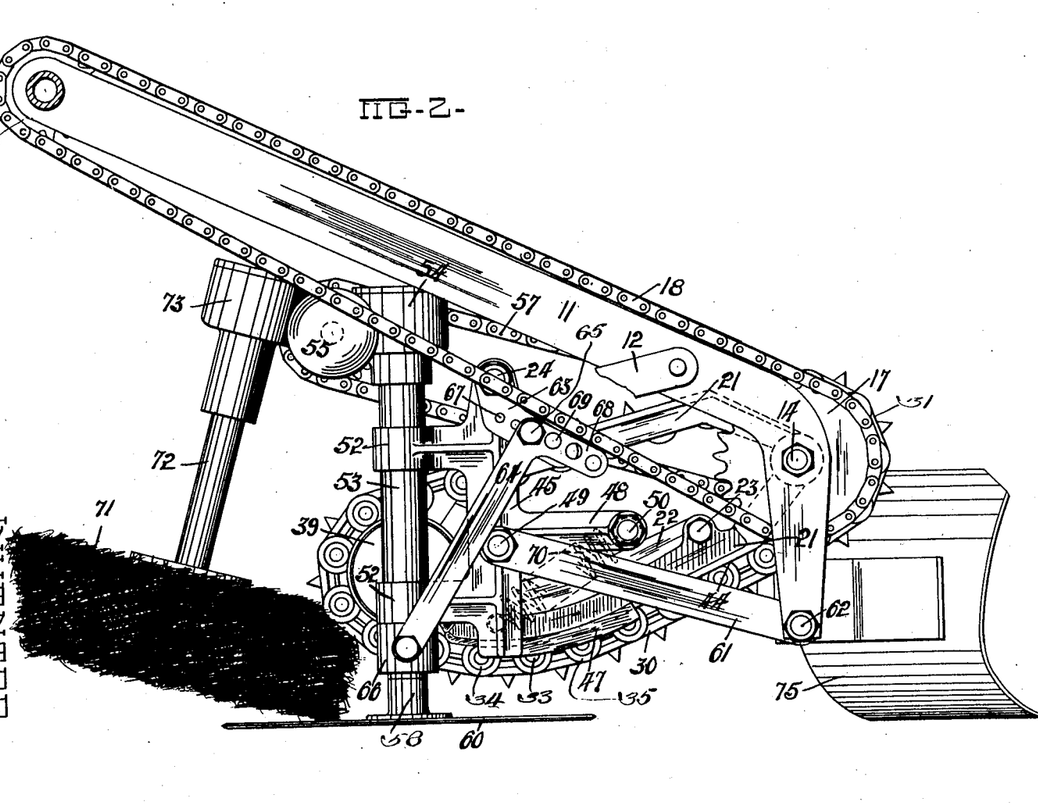
Figs. 2 and 3 are enlarged side elevations of the topping mechanism removed from the machine with parts removed and with parts broken away and with the tread means and knives in different relative positions of adjustment.
Figure 3:
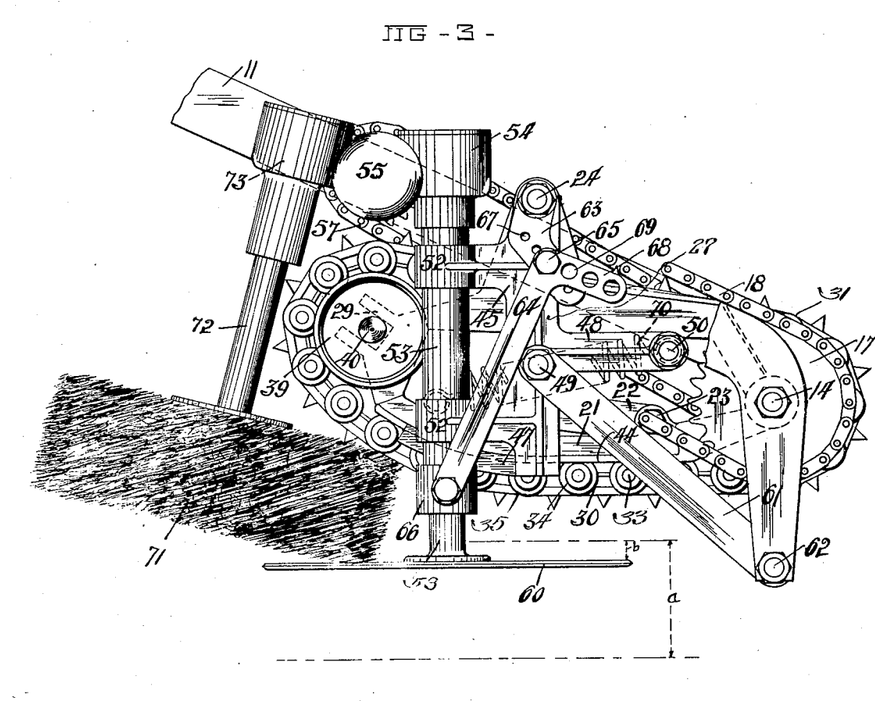

It is found preferable in practice to dispose the front edges of the cutting disks considerably in advance of the rear end of the tread belt when the belt frame is in its extreme lowered position, as shown in Fig. 2, the disk shafts, in the present instance, being disposed in advance of the rear end of the tread belt. In order to accommodate such relative positions of the belt and cutting disks, the lower run of the belt instead of being straight between the lower edges of the front and rear guide sprockets of the tread means extends straight for a distance rearward from the front guide sprockets, at a slight downward incline on a line extended between the lower edges of the front and rear sprockets and then describes a prolonged upward and rearward curve to the rear sprockets, the curve starting at a point substantially over the front edges of the cutting disks when the parts are in lowered position. When the tread belt and frame are swung upward the cutting disks move forward under the straight lower run portion of the belt without changing their cutting position with respect to a vertical, as shown in Fig. 3. With this arrangement and relation of the parts the tread belt remains in contact with and maintains its holding pressure on a beet top until after the beet is severed. This is an important feature as it insured accuracy of topping and prevents any vertical movement of the tread means and cutting disks from the starting of the cutting operation until finished irrespective of whether the tread means is in raised or lowered position. The curve at the rear end of the lower run of the tread belt provides for the requisite spacing between the belt and cutting disks when the belt is in its lowered position. The rearward portion of the guide members 44 is formed on a curve with a radius from shaft 24 as a center so that as the tread belt rises and falls and the knives move longitudinally thereof, the curve of the tread belt adjacent the knives remains uniform thereto.

70 designates a coiled tension spring, one of which extends upwardly and forwardly, in the present instance, from each rear bolt 23 of the tread frame (Figs. 2 and 3) and attaches at its forward end to the spacing sleeve 51 encircling the bolt-rod 50 of the topping-frame. These springs resist a raising of the tread-frame and tend to cause the tread-means to ride more smoothly over the irregular tops of beets by preventing the jumping action of the tread-frame which might otherwise be present as it travels over the beet tops.

The beet tops after being severed from the beets are discharged laterally of the topping mechanism by the action of a rotary brush 71. This brush is carried at the rear of the topping means and above the topping discs 60 at the rear of their axes by a shaft 72 which depends from a housing 73 provided centrally on the rear of the cross housing 55, the shaft being connected to the shaft 56 by a pair of spiral gears 74 (Fig. 4). The shaft 72 extends downward and rearward on a slight incline to a vertical so as to dispose the brush 71 at a slight incline to a horizontal with its forward peripheral edge in brushing relation to the tops of the cutting discs 60 at the rear of their points of coaction.

A plow or scraper blade 75 is carried at the lower forward end of each frame arm 11, and when the topping mechanism is in lowered operative positon the lower edges of the blades are disposed to dig a short distance into the soil surface at each side of the beet row, so that as the machine advances the top surface of the soil for a predetermined depth is removed and thrown outward at the sides of the row being traversed. The blade 75 for this purpose extends forward and inward to a point adjacent to the beets at each side of the row.

In the use of a machine equipped with my topping mechanism, the machine is placed in straddling relation to a row of beets to be topped and lifted, and the control shaft 7 then operated to lower the adjusting frame 3 and topping and lifting mechanism into operative relation to the row, with the forward ends of the lifting augers 8 projecting a desired extent down into the soil, and with the tread-belt in position to ride freely on the beet tops as the machine travels along the row. The tread-frame and its belt pivotally trail from the carrying shaft 15 on the front bolt 14 with the space between the ground and the forward end portion of the lower reach of the tread belt sufficient for the maximum height of beet which may be encountered. The lower reach of the tread belt normally extends downward and rearward from its forward end portion so that its rear end may have contact with the lower beets which may be encountered. The cutting discs when in normal lowered position are disposed in substantial register with or very close to the ground level so that for a low beet the top is severed at substantially the ground line. The adjustment may be such, however, that the knives when at their lowermost position will travel in a line below the normal surface line. As the machine advances the tread belt passes over the tops of the succeeding beets breaking down the foliage and rising and falling with the irregularity in height of the successive beets over which it passes so as to raise and lower the topping knives 60 in proportion to the height of projection of the beets. During a raising or lowering of the tread means, the topping-frame moves therewith but is prevented from swinging relative to a vertical position by reason of the parallelogram connection of the two, thereby causing the tread means to have longitudinal reciprocatory movements relative to the topping frame. When the tread means passes over a beet having a greater extent of projection above the ground than the preceding beet, the tread means rises to accommodate itself to the height of the beet and at the same time causes a rearward rocking of the arms 63 to communicate a relative lowering movement to the topping discs through the medium of the links 64 connected to the uprights 53 carrying the topping discs shafts. This relative lowering movement of the topping discs is sufficient to cause them to take a deeper bite or cut of the beet than would otherwise be occasioned, the depth of cut being proportional to the extent of projection of the beet above the ground but not coextensive therewith. This is a very important feature in beet topping mechanisms as it causes the topping means to automatically adjust itself to take varying cuts for beets projecting varying distances above the ground and at the same time does not make the cut coextensive with the extent of projection. The adjusting means provided for regulating the relative adjusting movements of the tread and topping means enables the amount of cut or top to be removed for different height beets to be adjusted to a nicety.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In a machine of the class described, a main frame, a cross shaft carried thereby, a tread frame pivotally trailing from the shaft, a tread belt mounted on the tread frame, a topping means pivotally carried by the tread frame at the rear of the shaft for swinging movements longitudinally of the tread frame and vertical movements therewith, said means having a vertical shaft mounted for axial movements and carrying a cutting member below the tread belt, means for driving the tread belt and cutting element shaft, means connecting the topping means and main frame to maintain the topping means shaft in vertical position irrespective of the movements of the tread frame, and means connecting the topping means, shaft and tread frame to impart differential axial adjustment to the shaft with respect to the tread frame upon vertical swinging movements of the frame.

2. In a machine of the class described, a main frame, a tread frame pivotally trailing from the frame, a tread belt mounted on the tread frame, a cross shaft fixedly carried by the upper portion of the tread frame, a topping frame carried by the shaft for swinging movements relative to the tread frame, means yieldingly connecting the tread and topping frames to normally retain them in one position of the relative movement, a shaft angled with respect to a horizontal carried by the topping frame, a cutting member carried by the lower end of the last shaft and projecting under the tread frame, means connecting the topping frame and main frame to maintain the topping frame and its shaft in one position relative to a horizontal irrespective of the rising and falling movements thereof with the tread frame, means connecting the cross shaft of the tread frame to the other shaft to axially adjust the latter shaft with respect to the tread and topping frames upon a vertical movement of said frame, and means for driving the tread belt and upright shaft.

3. In a machine of the class described, a main frame, a tread frame pivotally trailing from the main frame, a tread belt mounted on the tread frame, a topping frame pivotaly carried by the tread frame and having side members without the tread frame at opposite sides thereof, a vertical shaft carried by each side member, a cutting disk carried by each shaft and projecting under the tread belt, means for driving the tread belt and shafts, means connecting the tread frame and shafts to impart predetermined axial adjustment to the shafts from vertical swinging movements of the tread frame, and means connecting the main frame and topping frame to prevent swinging movements of the topping frame relative to a vertical when rising and falling with swinging movements of the tread frame.

4. In a machine of the class described, a main frame, tread means pivotally trailing from the main frame, topping means carried by the tread means for rising and falling movements therewith and movements relative thereto, means connecting the topping means and main frame for preventing a swinging of the former relative to a vertical when having rising and falling movements with the tread means, and a spring means connecting the tread means and topping means to exert a yielding downward pressure on the rear end portion of the tread means.

5. In a machine of the class described, a frame, a tread means and a topping means in operable combination trailing therefrom, and means for holding the tread means and topping means in a predetermined normally operable relation to one another independent of contact with the surface over which operating.

6. In a machine of the class described, a frame, a tread means and a topping means in operable combination as a unit adjustably trailing therefrom, the tread means and topping means being yieldingly held in a predetermined normally operable relation to one another independent of contact with the surface over which operating.

7. In a machine of the class described, a frame, a topping element and a tread means gauging the cut of the topping element and suspended together with the topping element from the frame for vertical movements relative thereto, the cutting edge of the topping element extending beneath the tread means whereby the pressure of the tread means on a beet top is maintained until after the severing of the top by the topping element, and means preventing the tread means and topping element from falling below a predetermined point with respect to the frame.

8. In a machine of the class described, a frame, a topping element and a tread means operatively suspended as a unit from the frame and mounted for vertical movements relative to each other and to the frame, the cutting edge of the topping element extending beneath the tread means a greater or less extent as the tread means is raised or lowered, and means for effecting differential vertical movements of the topping element and tread means when they are raised.

9. In a machine of the class described, a frame, a tread means carried by the frame for vertical movements relative thereto, a cutting element, and means connecting the cutting element, tread means and frame to raise and lower the cutting element with the tread means and to impart differential movements thereto during a raising and lowering thereof, the cutting element at all times being disposed below the tread means and in substantially the same relation to a vertical.

10. In a machine of the class described, a frame, a cutting element and a tread means trailingly suspended from the frame as a unit for differential movements, the cutting element permanently extending under the tread means, means automatically varying the vertical space between the cutting element and tread means when the tread means is vertically moved, and means yieldingly holding the cutting element and tread means in a predetermined normal relation.

11. In a machine of the class described, a supporting frame, a tread means trailing from the frame for vertical movements and having an elongated under tread surface, a cutting element carried by the tread means for vertical movements therewith and projected under the under surface of the tread means whereby the tread means rests on the beet top until completely severed by the cutting element, and means connecting the tread means and cutting element and operable to move the cutting element lengthwise of the tread means during vertical movements of the latter.

12. In a machine of the class described, a frame, a tread means carried by the frame, a cutting element permanently projecting under the tread means, and means connecting the cutting element, tread means and frame and operable to advance the cutting means under the tread means when the tread means is raised.

13. In a machine of the class described, a frame, a tread means carried by the frame, a cutting element permanently projecting under the tread means, and means connecting the cutting element, tread means and frame and operable to advance the cutting means under the tread means when the tread means is raised and to effect a variance in the vertical spacing between the tread means and the cutting element.

14. In a machine of the class described, a frame, a tread means carried by the frame for vertical swinging movements and having an elongated under tread surface, a cutting element carried by the tread means for swinging movements therewith and relative thereto lengthwise thereof, the cutting element projecting under the tread means, means operable to swing the cutting element lengthwise of the tread means but continually under the same when the tread means is vertically swung, and means for driving the tread means and cutting element.

15. In a machine of the class described, a frame, a tread means carried by the frame for vertical swinging movements and having an elongated under tread surface, a cutting element carried by the tread means for swinging movements therewith and relative thereto lengthwise thereof, the cutting element projecting under the tread means, means operable to swing the cutting element lengthwise of the tread means continually under the same when the tread means is vertically swung and to simultaneously vary the vertical spacing between the tread means and cutting element, and means for driving the tread means and cutting element.

16. In a machine of the class described, a frame, a tread means carried by the frame for vertical swinging movements relative thereto and including a tread belt having its lower run straight for a distance outward from the inner end of the tread means and then formed with a prolonged curve at its outer end, a topping means carried by the tread means for swinging movements therewith and having its cutting element projecting under the curved portion of the tread belt, means for driving the tread belt and topping means, and means exerting a yielding downward pressure on the outer end of the tread means to normally retain it at a predetermined lowered position.

17. In a machine of the class described, a supporting frame, a tread frame trailing from the supporting frame for swinging movements relative thereto, a tread belt operable on the tread frame, a topping means carried by the tread frame for swinging movements therewith and lengthwise thereof with its cutting element projected a distance under the tread belt whereby the belt remains in contact with a beet top until severed, means connecting the supporting frame and topping means to cause the cutting element of the topping means to be swung lengthwise of the tread belt when the tread frame and topping means have vertical swinging movements, and means for driving the tread belt and cutting element.

18. In a machine of the class described, a trailing tread means, a topping element extending beneath the tread means, for relative movements therewith, and means maintaining the contour of the tread means, adjacent that of the topping element, constant in relation to the contour of the topping element, irrespective of the relative movements of the tread means and topping element.

19. In a machine of the class described, a trailing tread means, a topping element extending beneath the tread means, means for maintaining the angle of the cut of the topping element substantially the same irrespective of the movements of the tread means, and means maintaining the contour of the tread means, adjacent that of the topping element, constant, irrespective of the movements of the tread means.

20. In a machine of the class described, a trailing tread means, a topping element extending beneath the tread means for relative movements therewith, and means maintaining the contour of the tread means substantially parallel to the cutting edge of the topping element at all times.

21. In a machine of the class described, a trailing tread means, a cutting element extending under the trailing end of the tread means, means increasing the distance between the tread means and the cutting element as the tread means rises and decreasing the distance between them as the tread means falls, and means stopping the fall of the tread means below a predetermined point independent of contact with the surface over which operating.

22. In a machine of the class described, a main frame, a tread frame pivotally trailing from the main frame, a tread belt mounted on the tread frame, a topping frame carried by the tread frame for swinging movements relative to the tread frame, means yieldingly connecting the tread and topping frames to normally retain them in one position of the relative movement, a shaft angled with respect to a horizontal carried by the topping frame, a cutting member carried by the lower end of said shaft and projecting under the tread frame, means connecting the topping frame and main frame to maintain the topping frame and its shaft in one position relative to a horizontal irrespective of the rising and falling movements thereof with the tread frame, and means for driving the tread belt and upright shaft.

23. In a machine of the class described, a frame, a topping element and a tread means gauging the cut of the topping element and suspended together with the topping element from the frame for automatic vertical movements relative thereto, the cutting edge of the topping element extending beneath the tread means whereby the pressure of the tread means on a beet top is maintained until the severing of the top by the topping element, means preventing the tread means and topping element from falling below a predetermined point with repect to the frame, and means suspending the topping element and tread means from the frame for automatic vertical movements relative thereto.

24. In a machine of the class described, a frame, a topping element and a tread means gauging the cut of the topping element and trailing together with the topping element from the frame for automatic vertical movements relative thereto, the cutting edge of the topping element extending beneath the tread means whereby the pressure of the tread means on a beet top is maintained until after the severing of the top by the topping element, and means preventing the tread means and topping element from falling below a predetermined point with respect to the frame.

25. In a machine of the class described, a frame, a cutting element and a tread means trailingly suspended from the frame as a unit for differential movements, the cutting element permanently extending under the tread means, means automatically varying the vertical space between the cutting element and tread means when the tread means is vertically moved, and means to exert a yielding downward pressure on the rear end portion of the tread means.

In testimony whereof I have hereunto signed my name to this specification.

WILLIAM H. KOPITKE.